United States Patent [19]
Barba

[11] Patent Number: 6,003,596
[45] Date of Patent: Dec. 21, 1999

[54] COVER FOR A STEAM RADIATOR AND FOR CIRCULATING AIR THEREPAST

[76] Inventor: Ralph J. Barba, 57-89 246 Crescent St., Douglaston, N.Y. 11362

[21] Appl. No.: 09/176,286

[22] Filed: Oct. 12, 1998

[51] Int. Cl.⁶ ........................................................ F24F 1/00
[52] U.S. Cl. ............................ 165/299; 165/57; 165/122; 165/53; 165/55; 237/79
[58] Field of Search ................................ 165/122, 53, 55, 165/57, 299; 237/79

[56] References Cited

U.S. PATENT DOCUMENTS

| D. 258,907 | 4/1981  | Jackson   | D23/137    |
|------------|---------|-----------|------------|
| D. 279,029 | 5/1985  | Sieverding| D23/155    |
| D. 309,776 | 8/1990  | Rudolph   | D23/385    |
| 1,855,565  | 4/1932  | Bennett   | 165/57     |
| 1,885,938  | 11/1932 | Meldahl   | 165/122    |
| 1,989,337  | 1/1935  | Roe       | 165/57     |
| 1,996,927  | 4/1935  | Lake      | 165/122    |
| 2,299,939  | 10/1942 | Swanson   | 165/57     |
| 2,846,196  | 8/1958  | Blackford | 165/122    |
| 4,121,560  | 10/1978 | Knight    | 126/63     |
| 4,392,478  | 7/1983  | Black     | 126/84     |
| 4,633,851  | 1/1987  | Hamilton  | 126/110 AA |

FOREIGN PATENT DOCUMENTS

| 0869279 | 1/1942 | France         | 165/122 |
|---------|--------|----------------|---------|
| 0089938 | 5/1984 | Japan          | 165/122 |
| 0170628 | 9/1984 | Japan          | 165/53  |
| 0708623 | 5/1954 | United Kingdom | 165/122 |
| 1127599 | 9/1968 | United Kingdom | 165/122 |

*Primary Examiner*—John K. Ford
*Attorney, Agent, or Firm*—Richard L. Miller, P.E.

[57] ABSTRACT

A cover for a steam radiator and for circulating air passing therepast. The cover includes a cover and blower apparatus. The cover covers the steam radiator. The blower apparatus is connected to the cover and circulates the air passing past the steam radiator. The blower apparatus includes a thermostat that is disposed in close proximity to the steam radiator, and extends therefrom to a blower fan, and activates the blower fan when the air becomes heated by the steam radiator to a predetermined temperature, which causes the air to be drawn in through intake vents in the front wall of the cover, up through an open top of the cover, into a main through opening in a bottom wall of a lid portion of the cover, downwardly out through a secondary through opening in the bottom wall of the lid portion, into an upper prismatic-frustrum-shaped funnel of the blower apparatus, into a lower prismatic-frustrum-shaped funnel of the blower apparatus, downwardly through an upper tube of the blower apparatus, into the blower fan, downwardly through a lower tube of the blower apparatus, forwardly into a manifold of the blower apparatus, and out outlet vents in the front wall of the cover.

8 Claims, 2 Drawing Sheets

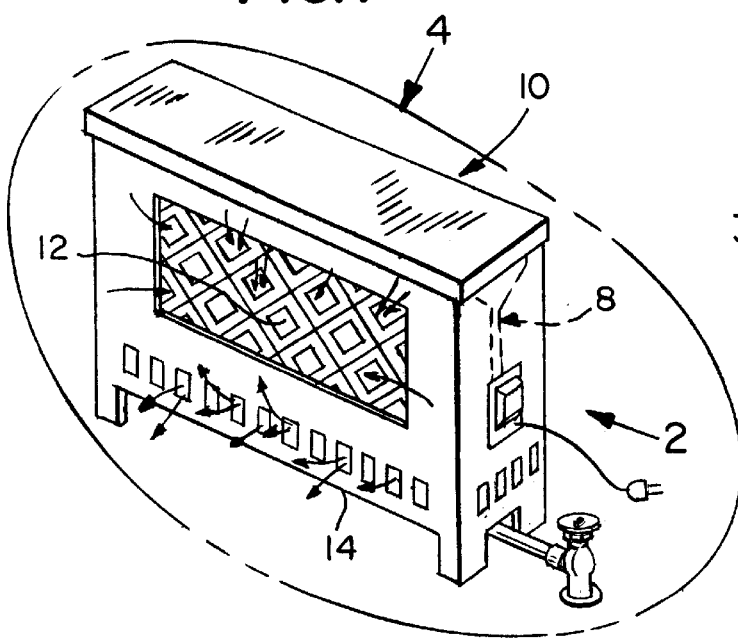
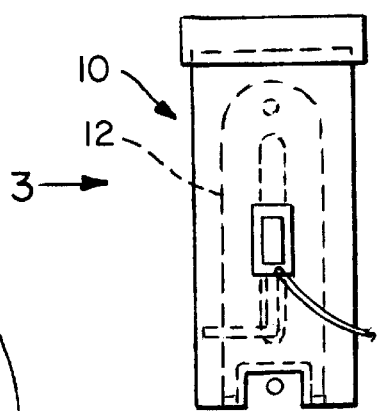
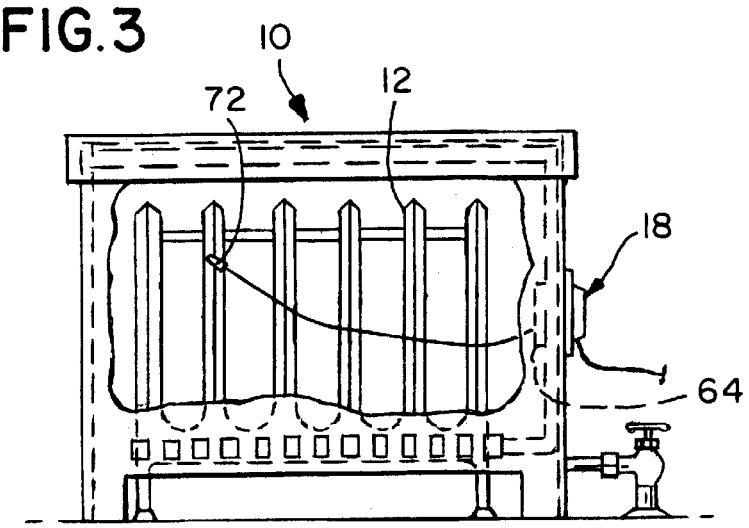

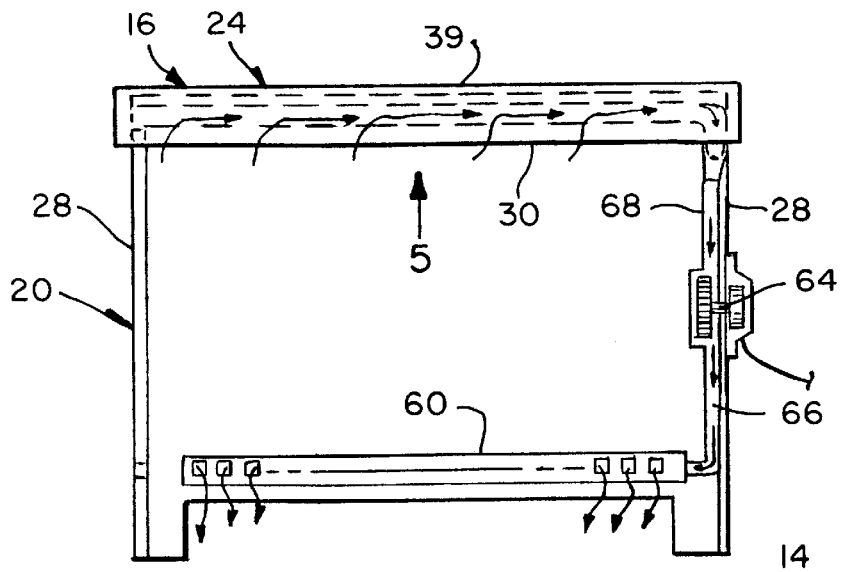
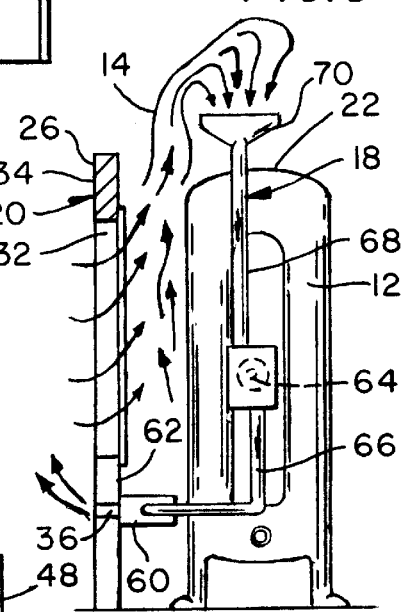
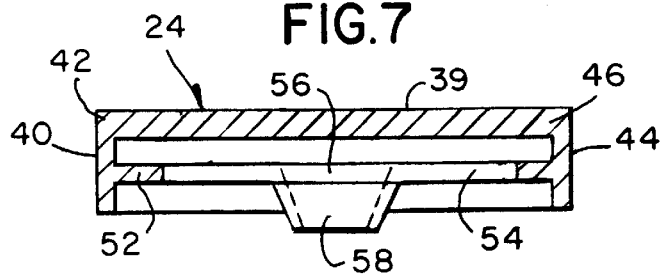
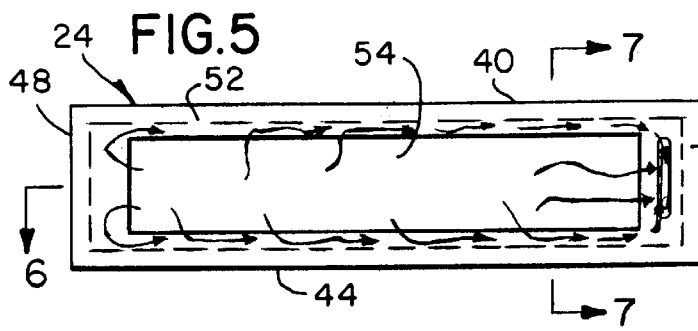
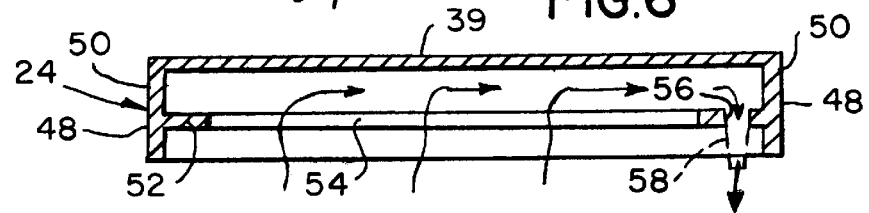

COVER FOR A STEAM RADIATOR AND FOR CIRCULATING AIR THEREPAST

BACKGROUND OF THE INVENTION

1. Field of the Invention

The present invention relates to a cover for a steam radiator. More particularly, the present invention relates to a cover for a steam radiator and for circulating air passing therepast.

2. Description of the Prior Art

Numerous innovations for heat related devices have been provided in the prior art that will be described. Even though these innovations may be suitable for the specific individual purposes to which they address, however, they differ from the present invention.

A FIRST EXAMPLE, U.S. Pat. No. Des. 258,907 to Jackson teaches the ornamental design for a steam radiator cover.

A SECOND EXAMPLE, U.S. Pat. No. Des. 279,029 to Sieverding teaches the ornamental design for a blower unit for portable heater.

A THIRD EXAMPLE, U.S. Pat. No. Des. 309,776 to Rudolph teaches the ornamental design for a wall heater cover.

A FOURTH EXAMPLE, U.S. Pat. No. 4,121,560 to Knight teaches a freestanding fireplace and room heater that is both pleasing in appearance and is an efficient room heater. The heater includes an upright firebox selectively sealed by a door on a front wall thereof. The door may be opened and swing to a position adjacent one side of the firebox for free access to the firebox interior. The door includes a removable glass window for a clear view of a fire within the firebox. The window may be selectively removed and replaced with a metal panel. A relatively inconspicuous blower unit is mounted at the rearward side of the firebox to receive and direct air across the back side, then out across the top, bottom, and sides of the firebox. Also included is a draft arrangement adjacent to the glass pane. The draft arrangement operates to draw cool air in and downwardly across the inside surface of the glass pane. The draft arrangement provides air to support combustion within the firebox and prevents build-up of soot and dust on the glass pane. A moveable draft control is provided on the metal panel that, when in place, may be used to vary the airflow through the draft arrangement. The firebox is designed to retain hot gasses in a turbulent atmosphere for a time prior to discharge through a smoke outlet.

A FIFTH EXAMPLE, U.S. Pat. No. 4,392,478 to Black teaches a heat circulation device which is portable to be usable placed upon conventional space heaters and particularly upon kerosene fueled heaters which includes a plenum housing adapted to be placed upon the heater which defines a plenum chamber therein for gathering heated air. The upper surface of the plenum chamber defines a generally convex heated surface and the sidewalls of the plenum chamber include apertures therein. A main housing is located immediately above the plenum housing which is adapted to provide a flow of cool air via a blower assembly wherein this cool air is guided to travel across the convection surface to be warmed thereby and then to travel past the hot air apertures to create a suction thereagainst similar to the Venturi principle and hence draw warm air outward therefrom. In this manner the heated air being supplied into the plenum chamber from the kerosene or other heater will be re-circulated in an outwardly directed manner 360 degrees with respect to the heat circulation device itself. The convection surface is convexed and inclined slightly downwardly in all directions to thereby urge this warm air into the lower areas of the surrounding room to facilitate circulation thereof.

A SIXTH EXAMPLE, U.S. Pat. No. 4,633,851 to Hamilton teaches a portable hot air circulator that comprises concentrically mounted cylindrical members, the inner member being closed at its upper end to form a cup-like structure designed to mount over a conventional liquid fuel heater in closely-spaced relation. Air is forced downwardly through an annular passageway between the cylindrical members by a fan mounted through the top of the outer cylindrical member which is closed to form a plenum space between the tops of the concentric cylinder members. The fan is shielded by a louvered hood member, and spacer clips accommodate the mounting over the liquid fuel heater.

It is apparent that numerous innovations for heat related devices have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a cover for a steam radiator and for circulating air passing therepast that avoids the disadvantages of the prior art.

ANOTHER OBJECT of the present invention is to provide a cover for a steam radiator and for circulating air passing therepast that is simple and inexpensive to manufacture.

STILL ANOTHER OBJECT of the present invention is to provide a cover for a steam radiator and for circulating air passing therepast that is simple to use.

BRIEFLY STATED, YET ANOTHER OBJECT of the present invention is to provide a cover for a steam radiator and for circulating air passing therepast. The cover includes a cover and blower apparatus. The cover covers the steam radiator. The blower apparatus is connected to the cover and circulates the air passing past the steam radiator. The blower apparatus includes a thermostat that is disposed in close proximity to the steam radiator, and extends therefrom to a blower fan, and activates the blower fan when the air becomes heated by the steam radiator to a predetermined temperature, which causes the air to be drawn in through intake vents in the front wall of the cover, up through an open top of the cover, into a main through opening in a bottom wall of a lid portion of the cover, downwardly out through a secondary through opening in the bottom wall of the lid portion, into an upper prismatic-frustrum-shaped funnel of the blower apparatus, into a lower prismatic-frustrum-shaped funnel of the blower apparatus, downwardly through an upper tube of the blower apparatus, into the blower fan, downwardly through a lower tube of the blower apparatus, forwardly into a manifold of the blower apparatus, and out outlet vents in the front wall of the cover.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention covering a steam radiator and circulating air passing therepast;

FIG. 2 is an enlarged diagrammatic side elevational view taken generally in the direction of arrow 2 in FIG. 1;

FIG. 3 is an enlarged diagrammatic front elevational view taken generally in the direction of arrow 3 in FIG.

FIG. 4 is an enlarged diagrammatic front elevational view of the area generally enclosed in the dotted ellipse identified by arrow 4 in FIG. 1 of the present invention;

FIG. 5 is an enlarged bottom plan view taken generally in the direction of arrow 5 in FIG. 4 of the replaceable top of the present invention;

FIG. 6 is a diagrammatic cross sectional view taken on line 6—6 in FIG. 5;

FIG. 7 is a diagrammatic cross sectional view taken on line 7—7 in FIG. 5; and

FIG. 8 is an enlarged diagrammatic side elevational view taken generally in the direction of dotted arrow 8 in FIG. 1.

LIST OF REFERENCE NUMERALS UTILIZED IN THE DRAWING 10 cover for a steam radiator and for circulating air passing therepast
12 steam radiator
14 air
16 cover for covering steam radiator 12
18 blower apparatus for circulating air 14 passing past steam radiator 12
20 main portion of cover 16 for encasing steam radiator 12
22 top of steam radiator 12
24 a lid portion for disposing at top 22 of steam radiator 12
26 front wall of main portion 20 of cover 16 for extending in front of steam radiator 12
28 pair of side walls of main portion 20
30 open top of main portion 20
32 inlet vents in upper portion 34 of front wall 26 of main portion 20 of cover 16 for allowing air 14 to enter therethrough
34 upper portion of front wall of main portion of cover 16
36 outlet vents in lower portion 38 of front wall of main portion of cover 16
38 lower portion of front wall of main portion of cover 16 for allowing air 14 to leave therethrough
39 top wall of lid portion 24 of cover 16
40 front wall of lid portion 24 of cover 16
42 forwardmost edge of front wall 40 of lid portion 24 of cover 16
44 rear wall of lid portion 24 of cover 16
46 rearwardmost edge of rear wall 44 of lid portion 24 of cover 16
48 pair of side walls of lid portion 24 of cover 16
50 side edges of top wall 39 of lid portion 24 of cover 16
52 bottom wall 52 of cover 16
54 main through opening in bottom wall 52 of lid portion 24 of cover 16
56 secondary through opening in bottom wall 52 of lid portion 24 of cover 16
58 upper prismatic-frustrum-shaped funnel of blower apparatus 18
60 manifold of blower apparatus 18
62 rear face of front wall 26 of main portion 20 of cover 16
64 blower fan of blower apparatus 18
66 lower tube of blower apparatus 18
68 upper tube of blower apparatus 18
70 lower prismatic-frustrum-shaped funnel of the blower apparatus 18
72 thermostat of blower apparatus 18

DESCRIPTION OF THE PREFERRED EMBODIMENT

Referring now to the figures, in which like numerals indicate like parts, and particularly to FIGS. 1–3, the cover for a steam radiator and for circulating air passing therepast of the present invention is shown generally at 10 for a steam radiator 12 and for circulating air 14 passing therepast.

The configuration of the cover for a steam radiator and for circulating air passing therepast 10 can best be seen in FIGS. 4–8, and as such will be discussed with reference thereto. The cover for a steam radiator and for circulating air passing therepast 10 comprises a cover 16 for covering the steam radiator 12, and blower apparatus 18 connected to the cover 16 for circulating the air 14 passing past the steam radiator 12.

The cover 16 comprises a main portion 20 for encasing the steam radiator 12, up until its top 22, and a lid portion 24 replaceably mounted to the main portion 20 of the cover 16 for disposing at the top 22 of the steam radiator 12.

The main portion 20 of the cover 16 is hollow and generally rectangular-parallelepiped-shaped.

The main portion 20 of the cover 16 has a front wall 26 for extending in front of the steam radiator 12, a pair of side walls 28 that extend perpendicularly from the front wall 26 of the main portion 20 of the cover 16, and an open top 30.

The front wall 26 of the main portion 20 of the cover 16 has inlet vents 32 through an upper portion 34 thereof for allowing the air 14 to enter therethrough, and outlet vents 36 through a lower portion 38 thereof for allowing the air 14 to leave therethrough.

The intake vents 32 in the front wall 26 of the main portion 20 of the cover 16 are diamond-shaped, and the outlet vents 36 in the front wall 26 of the main portion 20 of the cover 16 are square and horizontally aligned and horizontally spaced-apart, with the outlet vents 36 in the front wall 26 of the main portion 20 of the cover 16 being below the intake vents 32 in the front wall 26 of the main portion 20 because the air 14 leaving through the outlet vents 36 in the front wall 26 of the main portion 20 of the cover 16 is heated and hot air rises so as to assure facilitated circulation.

The lid portion 24 of the cover 16 is hollow, generally rectangular-parallelepiped-shaped and thin, and selectively opens and closes, and replaceably rests on, the open top 30 of the main portion 20 of the cover 16.

The lid portion 24 of the cover 16 has a top wall 39, a front wall 40 that depends perpendicularly from the top wall 39 of the lid portion 24 of the cover 16, at its forwardmost edge 42, a rear wall 44 that depends perpendicularly from the top wall 39 of the lid portion 24 of the cover 16, at its rearwardmost edge 46, a pair of side walls 48 that depends perpendicularly from the top wall 39 of the lid portion 24 of the cover 16, at its side edges 50, and a bottom wall 52 that extends below, and is parallel to, the top wall 39 of the lid portion 24 of the cover 16.

The blower apparatus 18 comprises the bottom wall 52 of the lid portion 24 of the cover 16 having a main through opening 54 that extends concentrically therethrough and is in fluid communication with the open top 30 of the main portion 20 of the cover 16.

The blower apparatus 18 further comprises the bottom wall 52 of the lid portion 24 of the cover 16 further having a secondary through opening 56 that is slot-shaped and extends therethrough, between the main through opening 54 in the bottom wall 52 of the lid portion 24 of the cover 16 and an adjacent parallel side wall of the pair of side walls 44 of the lid portion 24 of the cover 16.

The blower apparatus 18 further comprises an upper prismatic-frustrum-shaped funnel 58 that depends from, and is in fluid communication with, the secondary through opening 56 in the bottom wall 52 of the lid portion 24 of the cover 16.

The blower apparatus 18 further comprises a manifold 60 that extends along the front wall 26 of the main portion 20, at its rear face 62, and is in fluid communication with the outlet vents 36 in the front wall 26 of the main portion 20 of the cover 16.

The blower apparatus 18 further comprises a blower fan 64 that is mounted to a side wall of the pair of side walls 28 of the main portion 20 of the cover 16.

The blower apparatus 18 further comprises a lower tube 66 that is L-shaped and extends along the side wall of the pair of side walls 28 of the main portion 20 of the cover 16 and is in fluid communication with the manifold 60 of the blower apparatus 18 and the blower fan 64 of the blower apparatus 18.

The blower apparatus 18 further comprises an upper tube 68 that extends vertically upwardly along the side wall of the pair of side walls 28 of the main portion 20 of the cover 16 and is in fluid communication with the blower fan 64 of the blower apparatus 18.

The upper tube 68 of the blower apparatus 18 terminates in a lower prismatic-frustrum-shaped funnel 70 that is in fluid communication therewith and which replaceably receives the upper prismatic-frustrum-shaped funnel 58 of the blower apparatus 18 for fluid communication therewith.

As shown in FIG. 3, the blower apparatus 18 further comprises a thermostat 72 that is disposed in close proximity to the steam radiator 12, and extends therefrom to the blower fan 64 of the blower apparatus 18, and activates the blower fan 64 of the blower apparatus 18 when the air 14 becomes heated by the steam radiator 12 to a predetermined temperature, which causes the air 14 to be drawn in through the intake vents 32 in the front wall 26 of the main portion 20 of the cover 16, up through the open top 30 of the main portion 20 of the cover 16, into the main through opening 54 in the bottom wall 52 of the lid portion 24 of the cover 16, downwardly out through the secondary through opening 56 in the bottom wall 52 of the lid portion 24 of the cover 16, into the upper prismatic-frustrum-shaped funnel 58 of the blower apparatus 18, into the lower prismatic-frustrum-shaped funnel 70 of the blower apparatus 18, downwardly through the upper tube 68 of the blower apparatus 18, into the blower fan 64 of the blower apparatus 18, downwardly into the lower tube 66 of the blower apparatus 18, forwardly into the manifold 60 of the blower apparatus 18, and out the outlet vents 36 in the front wall 26 of the main portion 20 of the cover 16.

It will be understood that each of the elements described above, or two or more together, may also find a useful application in other types of constructions differing from the types described above.

While the invention has been illustrated and described as embodied in a cover for a steam radiator and for circulating air passing therepast, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

It is claimed:

1. A cover for a steam radiator and for circulating air passing therepast, said cover comprising:
    a) a cover for covering the steam radiator, wherein said cover comprises:
        i) a main portion for encasing the steam radiator, up until its top; and
        ii) a lid portion replaceably mounted to said main portion of said cover for disposing at the top of the steam radiator, wherein said main portion of said cover has:
            A) a front wall for extending in front of the steam radiator, wherein said front wall of said main portion of said cover has:
                I) inlet vents through an upper portion thereof for allowing the air to enter therethrough; and
                II) outlet vents through a lower portion thereof for allowing the air to leave therethrough;
            B) a pair of side walls that extend perpendicularly from said front wall of said main portion of said cover; and
            C) an open top;
        wherein said lid portion of said cover has:
            A) a top wall;
            B) a front wall that depends perpendicularly from said top wall of said lid portion of said cover, at its forwardmost edge;
            C) a rear wall that depends perpendicularly from said top wall of said lid portion of said cover, at its rearwardmost edge;
            D) a pair of side walls that depend perpendicularly from said top wall of said lid portion of said cover, at its side edges; and
            E) a bottom wall that extends below, and is parallel to, said top wall of said lid portion of said cover, and
    b) blower apparatus connected to said cover for circulating the air passing past the steam radiator, wherein said blower apparatus comprises said bottom wall of said lid portion of said cover having a main through opening that extends concentrically therethrough and is in fluid communication with said open top of said main portion of said cover, wherein said blower apparatus further comprises said bottom wall of said lid portion of said cover further having a secondary through opening that is slot-shaped and extends therethrough, between said main through opening in said bottom wall of said lid portion of said cover and an adjacent parallel side wall of said pair of side walls of said lid portion of said cover.

2. The cover as defined in claim 1, wherein said blower apparatus further comprises an upper prismatic-frustrum-shaped funnel that depends from, and is in fluid communication with, said secondary through opening in said bottom wall of said lid portion of said cover.

3. The cover as defined in claim 2, wherein said blower apparatus further comprises a manifold that extends along said front wall of said main portion, at its rear face, and is in fluid communication with said outlet vents in said front wall of said main portion of said cover.

4. The cover as defined in claim 3, wherein said blower apparatus further comprises a blower fan that is mounted to a side wall of said pair of side walls of said main portion of said cover.

5. The cover as defined in claim 4, wherein said blower apparatus further comprises a lower tube that is L-shaped extends along said side wall of said pair of side walls of said main portion of said cover, and is in fluid communication with said manifold of said blower apparatus and said blower fan of said blower apparatus.

6. The cover as defined in claim 5, wherein said blower apparatus further comprises an upper tube that extends vertically upwardly along said side wall of said pair of side walls of said main portion of said cover, and is in fluid communication with said blower fan of said blower apparatus.

7. The cover as defined in claim 6, wherein said upper tube of said blower apparatus terminates in a lower prismatic-frustrum-shaped funnel that is in fluid communication therewith, and which replaceably receives said upper prismatic-frustrum-shaped funnel of said blower apparatus for fluid communication therewith.

8. The cover as defined in claim 7, wherein said blower apparatus further comprises a thermostat that is disposed in close proximity to the steam radiator, and extends therefrom to said blower fan of said blower apparatus, and activates said blower fan of said blower apparatus when the air becomes heated by the steam radiator to a predetermined temperature, which causes the air to be drawn in through said intake vents in said front wall of said main portion of said cover, up through said open top of said main portion of said cover, into said main through opening in said bottom wall of said lid portion of said cover, downwardly out through said secondary through opening in said bottom wall of said lid portion of said cover, into said upper prismatic-frustrum-shaped funnel of said blower apparatus, into said lower prismatic-frustrum-shaped funnel of said blower apparatus, downwardly through said upper tube of said blower apparatus, into said blower fan of said blower apparatus, downwardly through said lower tube of said blower apparatus, forwardly into said manifold of said blower apparatus, and out said outlet vents in said front wall of said main portion of said cover.

\* \* \* \* \*